Figure 1:
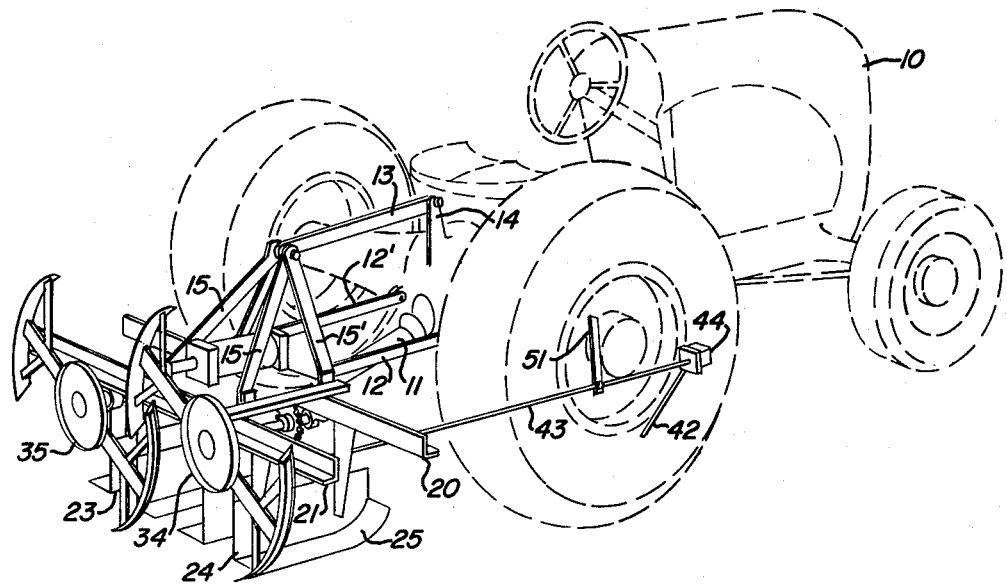

March 23, 1965     W. O. WRIGHT ETAL     3,174,554
ROW CROP CULTIVATING MACHINES Filed Jan. 30, 1964     3 Sheets-Sheet 1

INVENTORS:
William O. Wright
James L. Russell
BY- Dillon S. Turney
ATTORNEY

INVENTORS:
William O. Wright
James L. Russell
By- Dillon S. Turney
ATTORNEY

INVENTORS:
William O. Wright
James L. Russell
BY- Dillon S. Turney
ATTORNEY

United States Patent Office 3,174,554
Patented Mar. 23, 1965

3,174,554
ROW CROP CULTIVATING MACHINES
William O. Wright, 129 Green Castel Circle, Springfield, Ill., and James L. Russell, Rte. 4, Mount Pleasant, Iowa
Filed Jan. 30, 1964, Ser. No. 341,271
3 Claims. (Cl. 172—58)

Our invention relates to a farm implement for thinning and cultivating row crops, and more particularly to a tractor-mounted and driven rotary cutter for thinning and cultivating crops such as cotton, sugar beets, certain vegetables or truck garden crops, and the like.

In the planting and cultivation of certain types of row crops such as cotton and sugar beets, it has been found desirable to drill or plant the seed in a continuous row and after the plants have reached a certain stage of growth, then to proceed through the field cutting out, at spaced intervals, portions of the row, thus allowing room for the growth of the plants remaining. A number of machines for mechanically accomplishing this have been developed which utilized rotary knives or cutters designed, for example, to cut out six inchs of growing crop, then leaving two to four inches of the crop standing, and then cutting out another six inches, and so on throughout the length of the row. These machines have operated satisfactorily on the first pass or cultivation through the field; however, it is usually necessary to repeat the thinning and cutting operation and such machines have been difficult, if not impossible, to set and adjust so that the cuts made by the rotary knives on the second pass fall in exactly the same positions as the portions cut out during the first pass or thinning operation.

This invention is designed to eliminate and overcome this objection as well as to incorporate a number of other advantages which lead to rapid and economical crop thinning and cultivating operations. It consists generally in a pair of rotary cutting wheels mounted on a sliding frame and driven from a tractor power take-off which is geared to ground travel. The frame is supported by a customary 3-point hitch in trailing position from the farm tractor, and a hydraulic adjusting means is utilized to slide the wheel bearing frame forward and backward relative to the tractor and ground so that the cutting positions of the wheels can be set to coincide with the portions of the row that have previously been eliminating by cutting. A detector or indicator is provided which insures that the cutting portion of the wheels coincide with the cleared or cut part of the row, the indicator constantly checking on the position so that the operator need only control the tractor down the row without concern as to whether portions of the standing crop are being cut or damaged where it is not so intended.

Accordingly, it is an object of this invention to provide an improved cultivating machine for thinning of row planted crops.

It is a further object of this invention to provide an improved cutting and thinning machine for cultivating row crops wherein a plurality of crop rows are simultaneously thinned or cut in the exact amount or percentage as desired.

It is a further object of this invention to provide a cultivating and crop thinning machine having a longitudinal slidable frame supported by mounting from a tractor, and including a timing or indicating mechanism for insuring that the cutting portion of the wheels will be in contact with the row crop at the desired locations.

This invention and the advantages and benefits incorporated therein and to be derived therefrom will be better understood from the following description taken in connection with the accompanying drawings and its scope will be pointed out in the appended claims.

Figure 2:
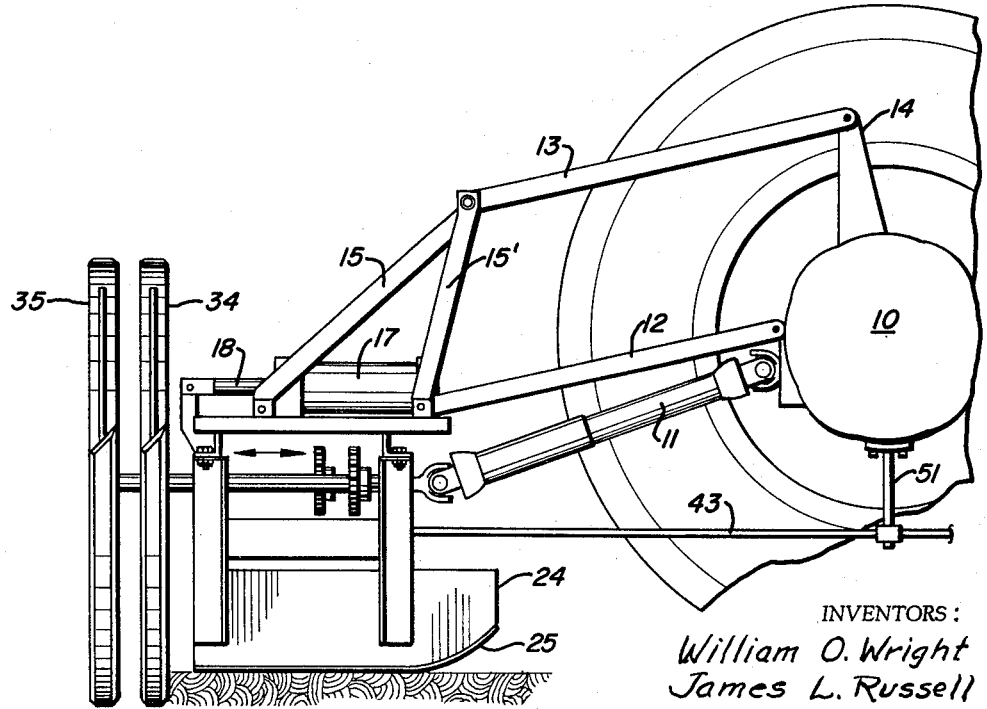
Figure 3:
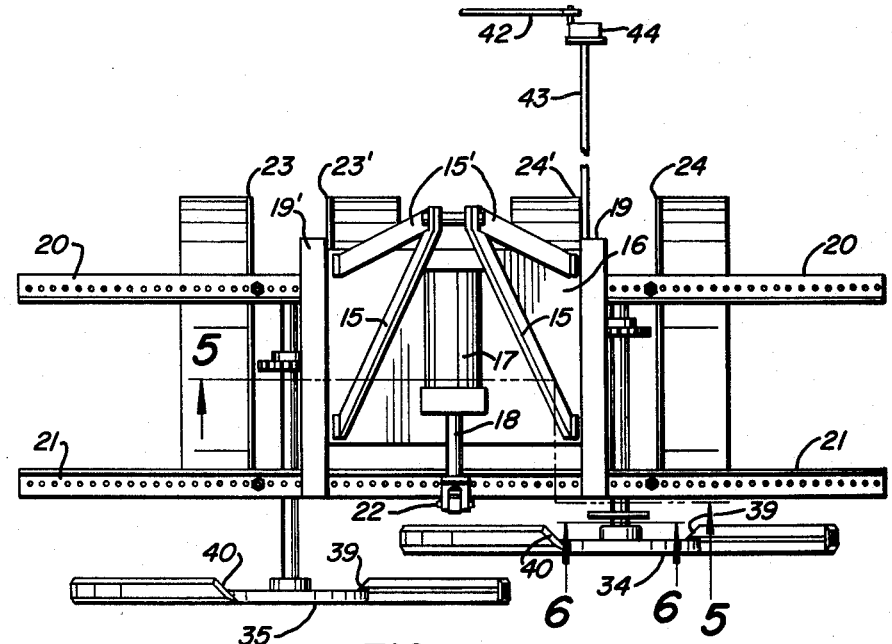
Figure 4:
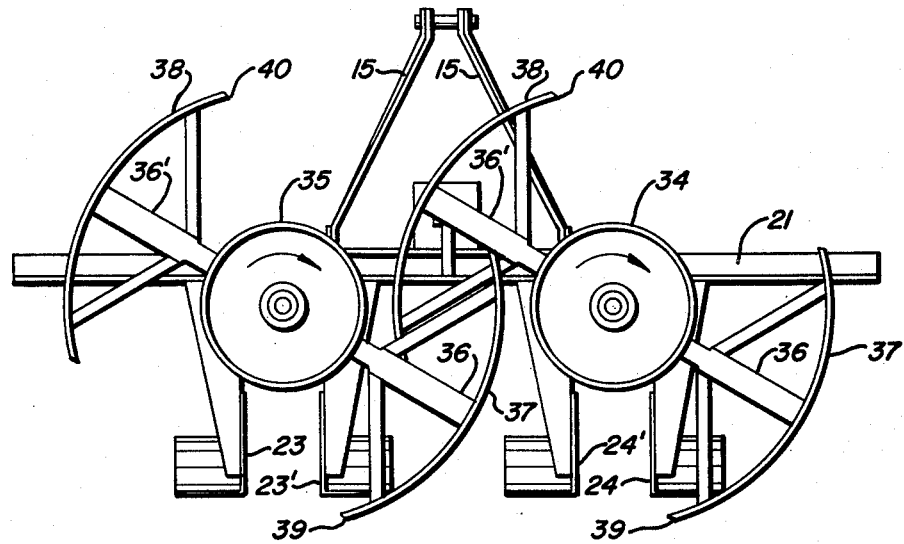
Figure 5:
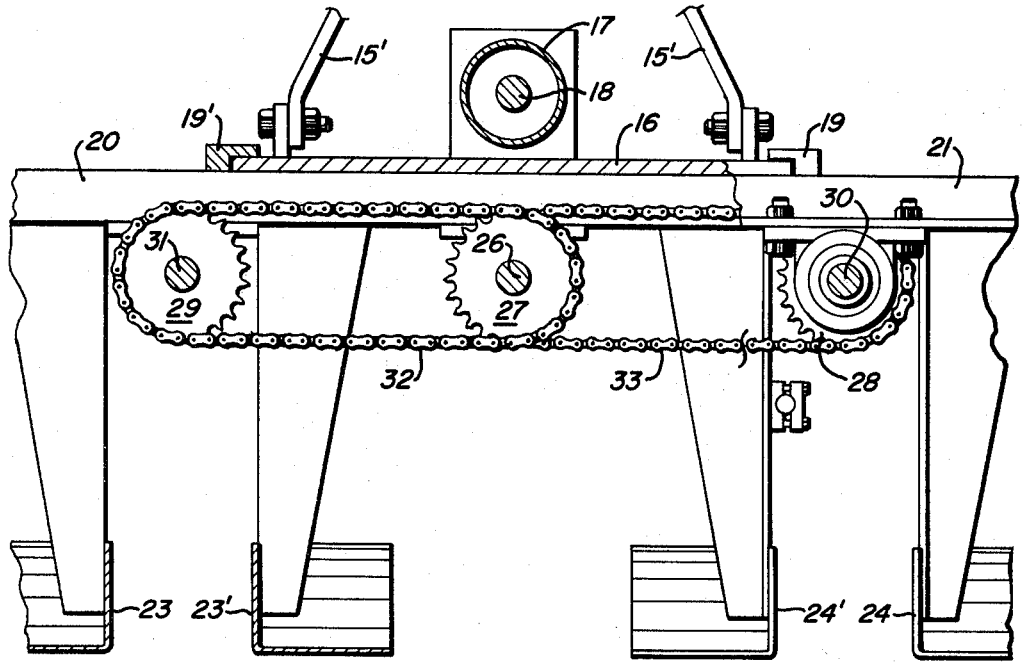
Figure 6:
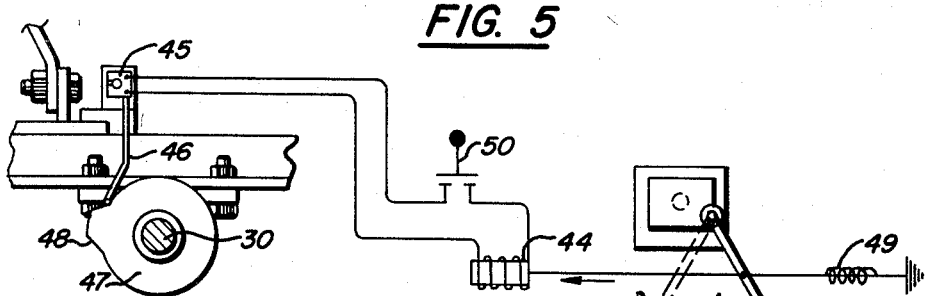
Figure 7:
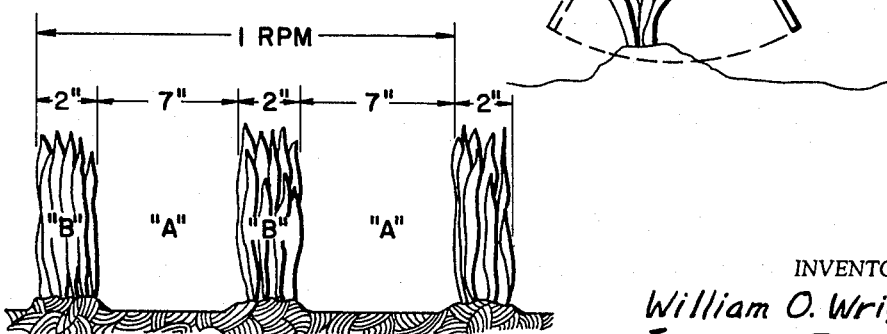

In the drawings,
FIGURE 1 shows a perspective view of this cultivating and crop thinning machine attached to the rear end of a farm tractor in operating position.
FIGURE 2 shows a side elevation view of the machine showing in more detail the mounting hitch arrangements and drive shaft connection.
FIGURE 3 shows a plan view of the machine showing the arrangement of the hydraulic operating cylinder, the supporting frame, and the cutting wheels.
FIGURE 4 shows a rear end elevation view showing the cutting wheels in a position for cutting or removing a portion of the row crop.
FIGURE 5 is a cross-section detail taken along the lines 5—5 of FIGURE 3 and further shows the mounting of the sliding frame as well as the drive connections to the cutting wheels.
FIGURE 6 is a schematic in partial detail showing the timing cam and arrangement for actuating the row indicator, and FIGURE 7 is a side view of a row crop such as cotton plants, showing the method of thinning by cutting out regularly spaced portions of the row.

Referring now to the drawings, and particularly FIGURES 1 and 2, there is shown a conventional farm tractor 10, in invisible outline since the tractor per se does not form any part of this invention, said tractor, however, being provided with a power take-off shaft 11 integrally geared to ground travel of the tractor. A 3-point hitch is provided to the tractor by means of the two braces 12 and 12', and the top brace 13. These braces are secured to the tractor frame at their foremost ends and secured to the mounting brackets 15 and 15' at their rearmost ends. While it is not shown in detail, the brace 13 is pivoted to an arm 14 and the entire assembly can be raised hydraulically by means of the customary hydraulic lift with which most tractors are equipped, the actuating arm 14 on the tractor serving to raise and lower the entire implement assembly. Such arrangement is desirable for transporting the implement from one field to another, or when not in actual use.

Refer now to FIGURE 3 and there will be noted a plate member 16 to which the lower ends of the braces 15 and 15' are secured and which plate 16 carries a hydraulic cylinder 17 mounted on its upper surface with the ram 18 extending rearwardly. The hydraulic cylinder, of course, being connected to the conventional hydraulic system on the tractor for operation by means of hydraulic hoses and control, which are not shown.

The plate member 16 is therefore mounted in fixed relationship with the tractor 10 by means of the supporting brackets 15 and 15' and braces 12, 12' and 13 and rearward and forward adjustment of the implement relative to the plate 16 is provided by means of the channels or guides 19 and 19' which support the plate 16 and which are best seen in FIGURE 5. The channels or guides 19 and 19' are securely mounted on the transverse frame members 20 and 21 and the outermost end of the ram 18 is secured to the frame member 21 by means of the pin 22. Thus, the assembly consisting of the frame 20 and 21 and other elements supported thereby, can be moved forwardly or rearwardly relative to the plate 16 by operation of the hydraulic cylinder 17 and its ram 18. The sliding frame 20 and 21 carries a pair of depending ground engaging skids and supports 23–23' and 24–24' which are provided with flattened sole plates having an upwardly sloping leading edge 25 and being spaced so that an interior passage is provided approximately the width of a planted and drilled row of cotton crop or other similar plants. As seen in FIGURE 4 and FIGURE 5, the ground contacting skids are spaced to accommodate two rows of planted crop and the spacing, of course, can be varied depending on the type of crop being cultivated, such adjustment being made by means of the multiple bolting holes in the transverse frame members 20 and 21.

Also secured from the underside of the frame members 20 and 21 in suitable bearings is a central drive shaft 26 which is directly connected to the power take-off shaft 11 and which is provided with a pair of sprockets 27 (only one being shown) for the purpose of transmitting drive power to either side to the sprockets 28 and 29 which are secured respectively to drive shafts 30 and 31. Link chains 32 and 33 are used to transmit power from the central shaft 26 to the two outboard shafts 30 and 31 which are positioned directly in line with the center line of the ground contacting skids 23 and 24.

As seen in FIGURE 4, secured to the rearwardmost end of each shaft 30 and 31 is a cutting wheel, 34 and 35 respectively, which comprises a central disc or hub member and two oppositely extending arms 36 and 36' upon which the arcuate cutting blades 37 and 38 are mounted. From FIGURE 4 it will be apparent that the blades are semi-circular in form and provided at their leading edges, 39 and 40, with diagonally bevelled and sharpened cuttings edges. The length of arc of the blades 37 and 38 of course determines the amount of row crop that is cut or removed and where a large portion of cutting is desired, naturally the arcuate length of the blades 37 and 38 will be greater and will occupy a greater percentage of the total periphery of the cutting wheel 34. The other cutting wheel 35 is constructed in an identical manner as the wheel 34 just previously described, and in order to allow the wheels to turn freely without interference, one wheel is located slightly to the rear of the other, as seen in FIGURE 2 or FIGURE 3.

Reference should now be had to FIGURE 7 which shows the manner in which this cultivating machine will thin or cut out regularly spaced portions of a row crop. FIGURE 7 shows that for each revolution of the cutting wheel 34, two spaces "A" of approximately 7 inches each of row crop are cut out and two alternate spaces "B" of approximately 2 inches each left standing, the same regularity and spacing continuing throughout the row. Of course, the other wheel 35 is similarly cultivating and thinning the adjacent crop row as the machine moves through the field. When it is time to cultivate and thin the crop for the second time, difficulty in most cultivating machines arises in that it is nearly impossible to synchronize the cutting wheel so that the cutting portion of the revolution falls in the same area as cleared on the first pass through the field, as shown by FIGURE 7.

In order to make a second and third cultivation possible without disturbing the portions of the row which are left to grow, we have provided an indicating and positioning system as shown in FIGURE 6, which consists of a swinging detector arm 42 which is mounted on a shaft 43 that extends forwardly of the implement and underneath the tractor where it can be visually seen by the operator. The detector arm 42 is preferably solenoid operated by means of the electrical solenoid 44 which in turn is controlled by an on-off switch 45, said switch being actuated by the lever 46 and cam 47. The cam 47 is secured to the shaft 30 and thus the rise 48 on the cam is always in the same relative position as the cutting blades 37 and 38 of the wheel 34, and is positioned to energize the detector arm 42 at the point where the cutting edge 39 of the wheel 34 enters the crop row on each revolution, and swing the arm across the crop row. As the wheel 34 rotates the rise 48 on the cam closes the switch 45 which in turn energizes the solenoid 44 and draws the detector arm 42 in a swinging movement as shown in FIGURE 6 indicating that a cleared or cut out space in the row should occur at this indication. A return spring 49 is utilized, as shown schematically, to return the detector arm 42 to its de-energized position.

In order to prevent the detector arm 42 from operating continuously during the cultivating operation a foot switch 50, as shown in FIGURE 6, is provided having normally open contacts, said switch 50 being located within easy reach of the operator's foot on the tractor proper. Thus, the detector arm circuit can be energized for short periods of time when setting up the machine for a second cultivation by holding the switch 50 depressed until the necessary spacing adjustments have been made. It should be pointed out that the shaft 43 on which the detector arm 42 is carried does not rotate, being merely supported at its front end in a guide 51 which may be in the form of a bracket secured to the underframe of the tractor 10. The shaft 43 merely acts as a spacer to set the indicator arm 42 a definite distance forward of the cutting wheels 34 and 35 since it is securely fastened to the sliding frame 21 which carries the cutting wheels. Thus the distance between the detector arm 42 and the cutting position of the blades is always fixed.

In starting to cultivate a row for the second or third time, it is only necessary for the operator to start the machine down the row, depress the foot switch 50 and drive slowly until the detector arm energizes by cam action and swings across the row which indicates the place where cutting will take place. If the rear assembly, consisting of the transverse frames 21 and 22 and associated wheels 34 and 35, is not in the correct position it is then a simple matter for the operator to actuate the hydraulic cylinder 17 which will shift the entire frame 20 and 21 and associated apparatus, including shaft 43 and indicator arm 42, forward or backward so that the cutting wheels 34 and 35 are commencing their cut at the point of actuation of the indicator arm 42. Since the power take-off of the tractor is directly geared to ground speed, once the cutting wheels have been properly set, as the tractor and implement move along the row, the detector arm, when energized, will swing across the row at the beginning of each cutting part of the cycle indicating that the cutting wheels are once again cutting through the row in the previous locations and removing any weeds or other undesired growth that may have returned in the row since the previous cultivation.

It should also be noted that the forward edges of the cutting blades 37 and 38 are sharpened for cutting purposes, that is, the edges lying next to the direction of travel, so that as the cutting blade 37 or 38 as the case may be, enters the ground at its leading edge 39, it will cut through the soil and any growth it encounters with a smooth even cut and continue the forward slicing action until the trailing edeg of the blade leaves the soil. Thus, a clean cut of any desired length is achieved depending on the distance of travel and on the peripheral length of the cutting blades 37 and 38.

In operation the weight of the machine is not supported by the 3-point hitch arrangement but the weight of the entire assembly rides on the skids 23–23' and 24–24'. Thus the relative position of the cutting blades 37 and 38 is always a fixed distance relative to the ground. This insures that the entire assembly closely follows the contour of the ground and rides on the sole plates 25 and thereby accommodates for ground unevenness along the planted row.

The implement is simple and rugged in construction, employs a minimum of moving and operating parts and has been found easy to set up, maintain and operate, and at the same time provides the operator with full control of the thinning and cutting action by observation of the swinging indicator marker 42 as previously described. The implement also lends itself to economical manufacture since very few precision parts or expensive equipment is needed for its construction, and it has been designed with the view in mind of easy attachment to the majority of standard or conventional farm tractors.

While there have been shown and described particular embodiments of this invention, it will be obvious to those skilled in the art that various changes and modifications can be made therein without departing from the invention and, therefore, it is intended in the appended claims to cover all such changes and modifications as fall within the true spirit and scope of this invention.

What we claim as new and desire to secure by Letters Patent of the United States is:

1. A row crop thinning and cultivating farm implement arranged for suspension from and attachment to the rear housing of a powered tractor including a base plate fixed rearwardly of said tractor, a transverse frame supported from said base plate by channels for sliding movement forwardly and rearwardly relative thereto, hydraulic means for positioning said frame relative to said base plate, a pair of spaced cutting wheels rotating in a transverse plane and supported by bearings on the underside of said frame, power transmission means for rotating said wheels from said tractor power source, each of said wheels having a pair of oppositely spaced peripheral cutting knives, said knives being arranged to cut transversely through a row crop at ground level at predetermined spaced intervals, and means associated with said frame and extending forwardly thereof including a solenoid-operated swinging indicator arm mounted on said tractor, spaced a pre-determined fixed distance forwardly of said transverse frame and synchronized with said cutting knives for detecting portions of said row crop that have previously been removed by swinging transversely through the crop row.

2. In combination with a powered tractor a machine for thinning and cultivating crops planted in parallel rows, means for supporting said machine rearwardly of said tractor in trailing position, means for raising and lowering said machine relative to said tractor and ground level, a transverse slidable frame carried by said supporting means, means for positioning said frame forwardly or rearwardly with respect to said support and said tractor, a plurality of cutting wheels positioned rearwardly of said frame and arranged for rotation by power transmission means from said tractor, a pair of earth contacting skids carried by said frame arranged to contact the ground on each side of a planted row crop, oppositely disposed cutting knives of each of said cutting wheels the peripheral length of said knives determining the length of row crop cut out by rotation of said wheel, and means including a visual indicator for detecting proper position of said frame with respect to portions of said row crop that have been removed in prior thinning and cutting operations, said last named means including a swinging indicator arm mounted on said tractor a fixed distance forwardly of said transverse sliding frame, said arm being electrically actuated at a definite point in the rotation of said cutting wheels.

3. In combination with a powered farm tractor having a power take-off, a machine for thinning and cultivating crops planted in parallel rows, means for supporting said machine rearwardly of said tractor in trailing position, means for raising and lowering said machine relative to said tractor and ground level, a transverse slidable frame carried by said supporting means, hydraulic means for positioning said frame forwardly or rearwardly with respect to said support and said tractor, a pair of cutting wheels positioned rearwardly of said frame on shafts and arranged for rotation in a plane transverse to line of travel by power transmission means from said tractor power take-off, a pair of earth contacting skids depending from said frame and arranged to contact the ground on each side of a planted row crop, oppositely disposed arcuate cutting knives carried by each of said rotatable wheels the peripheral length of said knives determining the portion of row crop cut out by rotation of said wheel, and means including a visual swinging indicator mounted on a fixed length push rod and spaced a predetermined distance forwardly of said transverse sliding frame for detecting proper position of said frame with respect to portions of said row crop that have been removed in prior thinning and cutting operations, said last named means including a solenoid-operated swinging indicator arm actuated by cam means associated with one of said shafts at a definite point in the rotation of said cutting wheels.

References Cited by the Examiner

UNITED STATES PATENTS

| 322,941 | 7/85 | Lamar | 172—108 |
| 2,775,926 | 1/57 | Blackstock | 172—47 |
| 2,788,726 | 4/57 | Keyes | 172—108 |
| 2,805,612 | 9/57 | Beard | 172—79 |
| 2,859,577 | 11/58 | Presler | 172—449 |

FOREIGN PATENTS

| 681,009 | 10/52 | Great Britain. |
| 825,386 | 12/59 | Great Britain. |
| 832,554 | 4/60 | Great Britain. |

ABRAHAM G. STONE, *Primary Examiner.*